March 26, 1957 F. F. BRUCKER 2,786,497
GUIDE FENCE FOR A MACHINE TABLE
Filed Feb. 10, 1955 2 Sheets-Sheet 1

Ferdinand F Brucker
Inventor

March 26, 1957 F. F. BRUCKER 2,786,497
GUIDE FENCE FOR A MACHINE TABLE
Filed Feb. 10, 1955 2 Sheets-Sheet 2
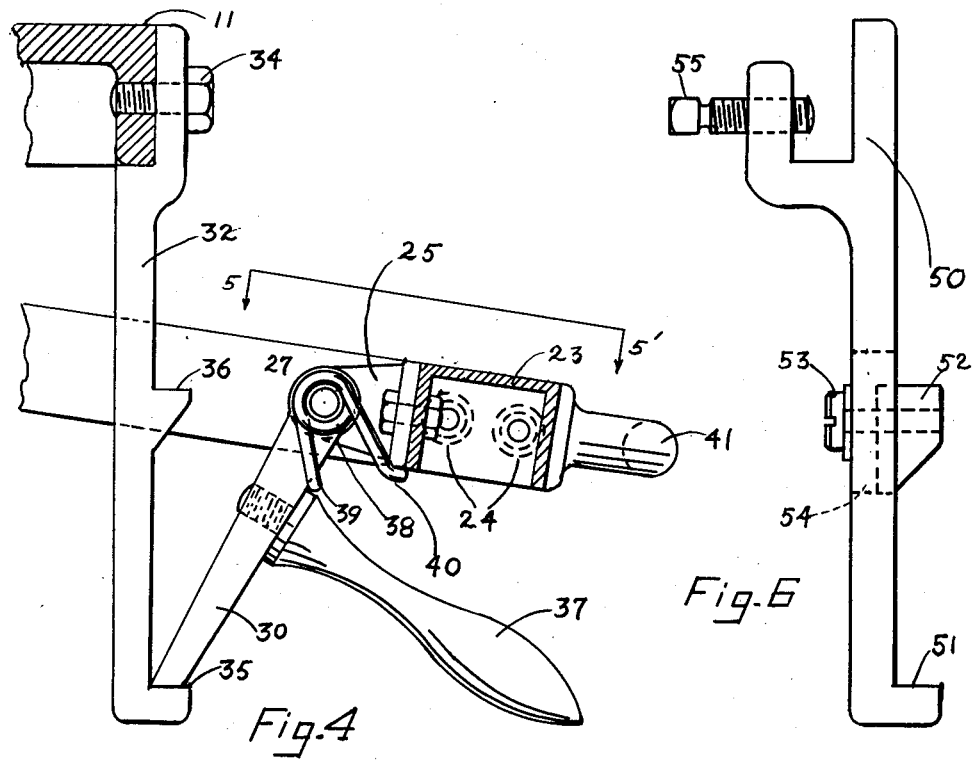
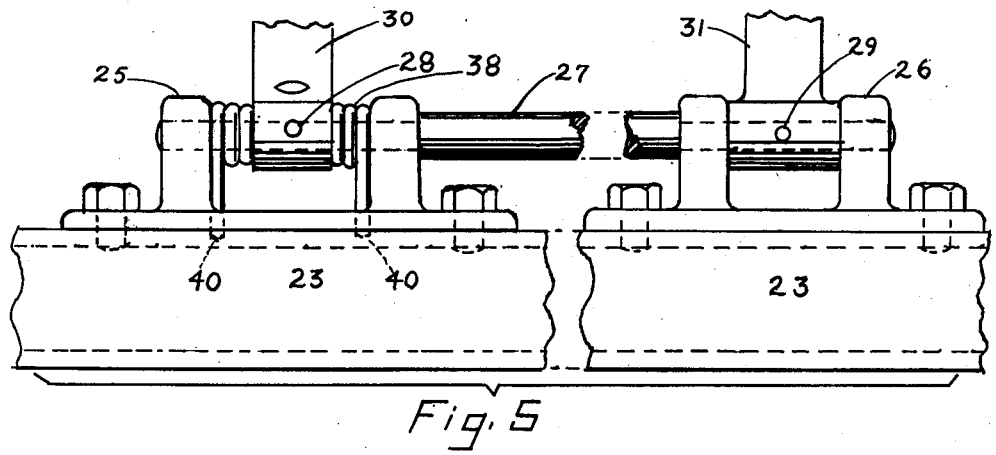
Ferdinand F. Brucker
Inventor

United States Patent Office 2,786,497
Patented Mar. 26, 1957

2,786,497

GUIDE FENCE FOR A MACHINE TABLE

Ferdinand F. Brucker, Akron, Ohio

Application February 10, 1955, Serial No. 487,247

4 Claims. (Cl. 143—174)

This invention relates to guide fences for machine tables of the type in which a rotating arbor for driving a cutter is supported beneath the table and the cutter projects through an opening therein and a fence is provided for guiding work past the cutter. The invention is especially useful in the construction of saw tables and the like.

The type of machines known generally as table saws are provided with a horizontal table having a slot therein. A circular saw blade or other cutter is mounted for rotation on an arbor below the table, with its blade extending above the table through the slot. For guiding work past the cutter, an adjustable guide or fence is movably mounted for adjustment across the face of the table and may be locked thereto at any desired position thereover.

Such table saws while used for many years in woodworking and manufacturing establishments have of late years also been used extensively in home workshops and special table saws designed for the home workshop are in use.

Most of the operations performed upon a table saw may be divided into two classes, namely, ripping and crosscutting. In the ripping operation a fence is mounted parallel to the saw blade to guide the work. In crosscutting, the work is moved past the saw blade by a carriage or miter gauge moved along a groove in the table. In the cross-cutting operation the fence is in the way and must usually be removed.

It will be seen that if work is to be done without waste of time it will be convenient to provide one saw table for ripping operations and another for cross-cutting. While this method of providing a plurality of saw tables has been pursued in commercial woodworking plants, it involves extra investment in equipment and extra space. In the home workshop the owner must be satisfied with a single saw table in view of the extra expense and extra space required and must put up with removing the fence every time a cross cut is made and replacing it when a rip cut is necessary.

The removal and replacement of a fence is not always easy and in any event consumes time. Also the fence is liable to be thrown out of alignment by dropping it and requires to be stored out of the way when not in use.

It is an object of the present invention to provide a single saw table which may be adjusted instantly from ripping to cross-cutting or vice versa without removing the fence from the machine.

A further object is to provide a saw fence which may be quickly dropped below the face of the table when desired to clear the table face.

These and other objects will appear from the following description and the accompanying drawings.

Of the drawings,

Fig. 4 is a detail sectional view thereof taken on line 4—4' of Fig. 3.

Fig. 5 is a detail view, taken on line 5—5' of Fig. 4.

Fig. 6 is a detail view of a modified stop construction.

Figure 1:
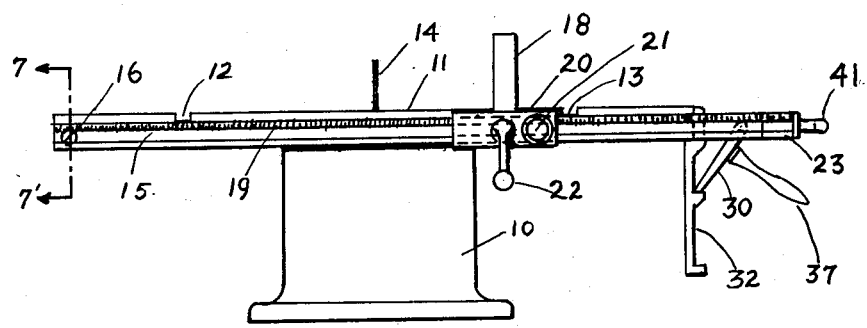
Fig. 1 is a front view of a saw table constructed in accordance with and embodying the invention, the fence being raised.

Referring to the drawings which show the invention as applied to a saw table, the numeral 10 designates the supporting pedestal and 11 the table of a circular saw table. The type of saw table shown is one generally used in home workshops. Its table has longitudinal grooves 12, 13 for receiving movable gauges. The circular saw blade 14 projects through a slot in the table.

Figure 7:
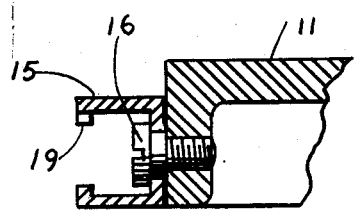
Fig. 7 (Sheet 1) is a sectional view, taken on line 7—7' of Fig. 1.

To guide a rip fence, a guide bar 15 of C-shaped cross section (Fig. 7) is pivotally mounted to the table at one end thereof by a shouldered screw 16. A second guide bar 17 of C-shaped cross section is pivotally mounted on a similar screw at the other end of the table, the shouldered screws being on the same axis. The rip fence 18 is slidably mounted on the two guide bars, the bar 15 being provided with rack teeth 19 to engage a pinion rotatably mounted on a carriage 20 which slides upon the bar 15 and a knob 21 is fixed to the pinion for rotating it and moving the fence along the guide bars.

A lock is also provided to clamp the carriage to the guide bars and is operated by a knob 22 on the carriage.

Figure 2:
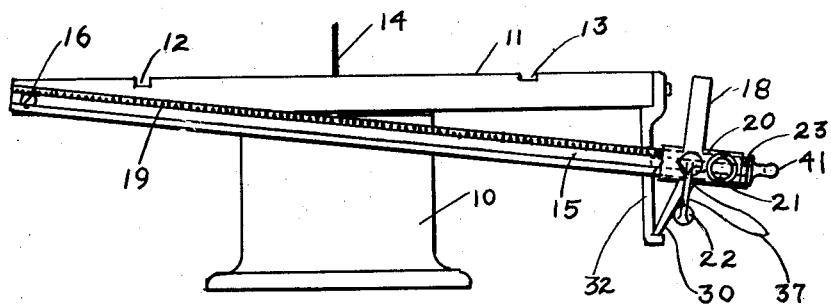
Fig. 2 is a similar view thereof with the fence lowered.
Figure 3:
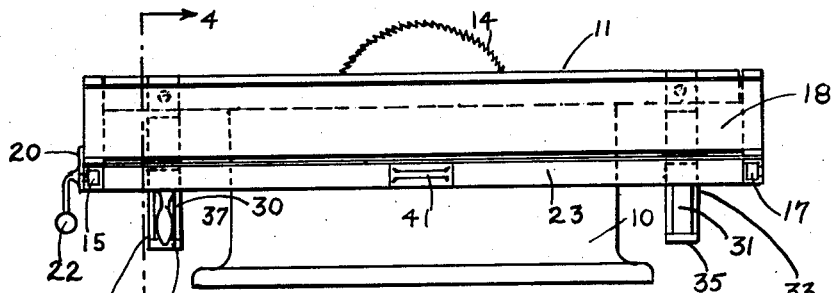
Fig. 3 is a side view thereof with the fence lowered.

To provide for moving the fence below the face of the table to permit cross-cutting of a long work piece, the guide bars 15, 17 are secured to each other at their free ends by a cross-bar 23. This bar may be of channel-shape in cross section (Fig. 4) and its ends are secured to the guide bars by screws 24. These screws are similar to the screw 16 and clear the carriage mechanism. Mounted on the cross bar 23 are a plurality of brackets 25, 26 having aligned bearings for a shaft 27. Secured to the shaft 27 as by taper pins 28, 29 are a pair of pawls 30, 31. A pair of depending stop brackets 32, 33 are secured to the saw table as by machine screws 34. Each stop bracket has a lower stop 35 and an upper stop 36. The arrangement is such that with the pawls 30, 31 resting on the upper stops, the guide bars 15, 17 are parallel to the table top and with the pawls resting upon the lower stops, the fence 18 is below the table top as shown in Figs. 2 and 3.

The pawl 30 has an operating handle 37 secured thereto for rotating the shaft 27 to engage and disengage the pawls. For urging the pawls in a clockwise direction, as seen in Fig. 4, a torsion coil spring 38 is mounted about the shaft 27 and has a central stirrup 39 to engage about the pawl 30 and ends 40 to engage the bracket 25.

For lifting the cross bar 23 and with it the guide bar and the fence, a bar-grip handle 41 is secured to the cross bar. The arrangement is such that for raising the fence for use the cross bar may be raised by grasping the handle 41 to lift it and the pawls will be urged toward the stop brackets by the coil springs and will ratchet over the upper stops. Also in lowering the fence, it is racked out to the height of the table top, as seen in Fig. 2. The handle 37 is grasped by one hand while the handle 41 is grasped by the other hand. Handle 41 may be lifted slightly while rotating shaft 27 counter-clockwise against the tension of spring 38 to move the pawls to a position clearing the upper stops. The handle 41 is lowered and handle 37 released after the pawls are released from the upper stops. The pawls then come to rest on the lower stops.

In the embodiment of of the stop bracket illustrated in Fig. 6, the bracket 50 has a fixed lower stop 51. The upper stop 52 is clamped to the bracket by a screw 53, a slot 54 being provided in the bracket to accommodate adjustment and the stop 52 having a tang entering the slot.

The upper portion of the bracket 50 is bifurcated to embrace the skirt of the table. A set screw 55 is provided through one limb of the bracket to clamp the bracket to the table. The clamp-on type of bracket is especially useful where an existing saw table is to be provided with a lowering fence mechanism. The adjustable upper stop is useful in aligning the guide bars so that the fence clears the table properly. Such an adjustable stop may be provided on the stop bracket 32 if desired.

While the invention has been shown as applied to one type of saw table, it will be apparent that it may be applied to other tables having guide bars of other shapes by providing the ends of the cross-bar to accommodate guide bars of other shapes.

Furthermore the assembly of guide bars, fence, and cross bars may be counterbalanced if desired, as for example, by a tension coil spring having one end secured to the table and the other end secured to the pawl 30.

These and other modifications may be made without departing from the scope of the invention as it is defined by the following claims.

I claim:

1. A machine table having a table top, a rotatable cutter extending thereabove, guide-means adjacent on edge of said table top, a fence movable along said guide-means and normally over said table, means pivotally supporting said guide means from said table about a horizontal axis at one end of said guide means, and means adjustably supporting the opposite end of said guide means from said table to position said fence above or below said table top.

2. A circular-saw table having a table top, guide bars flanking said table top to adjustably support a fence, said guide bars each having one end thereof pivotally secured to said table top about a horizontal axis, vertically spaced stops mounted on said table and at least one pawl mounted on said guide bars for engaging a selected stop and supporting said bars at one of a plurality of elevations relative to said table.

3. A work guide for use with a saw table, said guide comprising a pair of guides adapted to be pivotally mounted at one end of each about a horizontal axis at one end of the table, a fence movable along said guides and normally over said table, vertically spaced stop means adapted to be secured to the opposite ends of the table, and means mounted on the opposite ends of said guides and selectively engageable with said stop means to support said fence selectively above or below the face of said table.

4. A machine table of the type having a work supporting table top, a rotatable cutter extending above the table top, and a work guide above said table, said machine table comprising a pair of parallel guide bars flanking said table and extending beyond it at one end, a cross bar connecting the extending ends of said guide bars to each other, the opposite ends of said guide bars being pivotally mounted about a common horizontal axis on said table, said work guide being adjustable along said guide bars to a position beyond said table top, and means for pivotally moving said guide bars to a position where said work guide is below said table top.

References Cited in the file of this patent
UNITED STATES PATENTS

| | | |
|---|---|---|
| 1,563,325 | Bielaski | Dec. 1, 1925 |
| 1,938,548 | Tautz | Dec. 5, 1933 |
| 2,488,077 | Buday | Nov. 15, 1949 |
| 2,521,302 | Musselman | Sept. 5, 1950 |